United States Patent
Manske et al.

(10) Patent No.: US 10,152,694 B2
(45) Date of Patent: Dec. 11, 2018

(54) SEMI-AUTOMATIC OBJECT REUSE ACROSS APPLICATION PARTS

(71) Applicant: SAP SE, Walldorf (DE)

(72) Inventors: Knut Manske, Oftersheim (DE); Slavin Donchev, Mannheim (DE); Markus Latzina, Wiesenbach (DE)

(73) Assignee: SAP SE, Walldorf (DE)

(*) Notice: Subject to any disclaimer, the term of this patent is extended or adjusted under 35 U.S.C. 154(b) by 333 days.

(21) Appl. No.: 15/281,533

(22) Filed: Sep. 30, 2016

(65) Prior Publication Data

US 2018/0095651 A1   Apr. 5, 2018

(51) Int. Cl.

| | |
|---|---|
| *G06F 3/048* | (2013.01) |
| *G06F 3/0481* | (2013.01) |
| *G06Q 10/10* | (2012.01) |
| *G06F 3/0484* | (2013.01) |
| G06F 17/27 | (2006.01) |
| G06F 9/451 | (2018.01) |
| G06F 17/24 | (2006.01) |
| G06F 8/38 | (2018.01) |
| G06F 8/34 | (2018.01) |

(52) U.S. Cl.
CPC ......... *G06Q 10/105* (2013.01); *G06F 3/0481* (2013.01); *G06F 3/04842* (2013.01); *G06F 3/04847* (2013.01); *G06F 8/34* (2013.01); *G06F 8/38* (2013.01); *G06F 9/451* (2018.02); *G06F 17/243* (2013.01); *G06F 17/2785* (2013.01)

(58) Field of Classification Search
CPC .......... G06F 9/451; G06F 8/38; G06F 3/0481; G06F 8/34; G06F 3/04847; G06F 3/04842; G06F 17/243; G06F 17/2775; G06F 17/2785
See application file for complete search history.

(56) References Cited

U.S. PATENT DOCUMENTS

| | | | | |
|---|---|---|---|---|
| 9,152,918 | B1* | 10/2015 | McNair | G06N 7/005 |
| 2003/0046421 | A1* | 3/2003 | Horvitz | G06Q 10/107 |
| | | | | 709/238 |
| 2003/0212679 | A1* | 11/2003 | Venkayala | G06F 17/30705 |
| 2007/0179746 | A1* | 8/2007 | Jiang | G06F 11/008 |
| | | | | 702/185 |
| 2010/0269099 | A1* | 10/2010 | Yoshimura | G06F 8/36 |
| | | | | 717/122 |
| 2013/0117276 | A1* | 5/2013 | Hedditch | H04L 67/306 |
| | | | | 707/747 |
| 2015/0033362 | A1* | 1/2015 | Mau | G06K 9/00288 |
| | | | | 726/27 |
| 2016/0092036 | A1* | 3/2016 | Rodgers | G06F 17/30076 |
| | | | | 715/762 |
| 2018/0225667 | A1* | 8/2018 | Wang | G06Q 20/4016 |

* cited by examiner

*Primary Examiner* — Tuyetlien T Tran
(74) *Attorney, Agent, or Firm* — Buckley, Maschoff & Talwalkar LLC (57) ABSTRACT

According to some embodiments, a source application part may be established having a source data object with a set of source attribute identifiers and associated source attribute values. A target application part may also be established having a target data object with a set of target attribute identifiers. An object reuse platform may then receive, from a user via a graphical interface, an indication that the source data object relates to the target data object. The object reuse platform may then calculate, for each source attribute identifier, a probability that the source attribute identifier is associated with one of the target attribute identifiers.

17 Claims, 11 Drawing Sheets

SEMI-AUTOMATIC OBJECT REUSE ACROSS APPLICATION PARTS

FIELD

Some embodiments are associated with the use of data objects in applications. In particular, some embodiments describe semi-automatic ways to reuse information about objects across application parts.

BACKGROUND

An application may utilize one or more data objects. For example, a human resources application might include a user interface area that displays a number of different data objects, and each data object could represent a different employee. Moreover, each data object might be associated with a set of attribute identifiers, such as employee name, employee telephone number, etc., and each attribute identifier might have a particular value for that particular employee. In some cases, a user might be interested in reusing information within a data objected in another part of the application or even in an entirely different application. For example, a user might want to copy an employee's name and email address from a human resources application into a payroll application (e.g., associated with the same enterprise).

It is known that the user can individually review information in a data object and decide to "cut-and-paste" information into another application part or another application as appropriate. Such an approach, however, can be a time consuming, repetitive, and error-prone process. It is also known that an application designer can create a map that defines how certain data object attributes should be used in other application parts. For example, an application designer might realize that "PO Number" in one application part should be mapped to "Purchase Order Identifier" in another application part. This process can also be labor-intensive and error prone, especially when a substantial number of applications and/or data objects are involved. Moreover, such an approach might not even be feasible with respect to applications that are not known to the designer at design time (e.g., because he or she is not aware of what choices will be available to the system when a user eventually wants to reuse data object information). As a result, the information in data objects will not be available for efficient reuse "on-the-fly" as a user accesses new applications.

It may therefore be desirable to provide systems and methods to facilitate a semi-automatic reuse of data object information across applications and/or across application parts in an efficient and accurate manner.

SUMMARY OF THE INVENTION

According to some embodiments, systems, methods, apparatus, computer program code and means are provided to facilitate a semi-automatic reuse of data object information across applications and/or across application parts in an efficient and accurate manner. In some embodiments, a source application part may be established having a source data object with a set of source attribute identifiers and associated source attribute values. A target application part may also be established having a target data object with a set of target attribute identifiers. An object reuse platform may then receive, from a user via a graphical interface, an indication that the source data object relates to the target data object. The object reuse platform may then calculate, for each source attribute identifier, a probability that the source attribute identifier is associated with one of the target attribute identifiers.

Some embodiments comprise: means for establishing a source application part having a source data object with a set of source attribute identifiers and associated source attribute values; means for establishing a target application part having a target data object with a set of target attribute identifiers; means for receiving, via a graphical interface, an indication that the source data object relates to the target data object; and means for calculating, for each source attribute identifier, a probability that the source attribute identifier is associated with one of the target attribute identifiers.

In some embodiments, a communication device associated with a backend application computer server exchanges information with remote devices. The information may be exchanged, for example, via public and/or proprietary communication networks.

Technical effects of some embodiments of the invention are improved and computerized ways to facilitate a semi-automatic reuse of data object information across applications and/or across application parts in an efficient and accurate manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

An "application" may utilize one or more data objects. For example, an inventory application of an enterprise might include a user interface area that displays a number of different data objects, and each data object could represent a different manufacturing components. Moreover, each data object might be associated with a set of attribute identifiers, such as part identifier, size, etc., and each attribute identifier might have a particular value for that particular manufacturing component. In some cases, a user might be interested in reusing information within a data objected in another part of the application or even in an entirely different application. For example, a user might want to copy a component's date of installation from one application into a warranty application (e.g., associated with the same enterprise).

It is known that the user can individually review information in a data object and decide to "cut-and-paste" information into another application part or another application as appropriate. Such an approach, however, can be a time consuming, repetitive, and error-prone process. It is also known that an application designer can create a map that defines how certain data object attributes should be used in other application parts. For example, an application designer might realize that "Vehicle Identification Number" in one application part should be mapped to "VIN" in another application part. This process can also be labor-intensive and error prone, especially when a substantial number of applications and/or data objects are involved. Moreover, such an approach might not even be feasible with respect to applications that are not known to the designer at design time.

Figure 1:
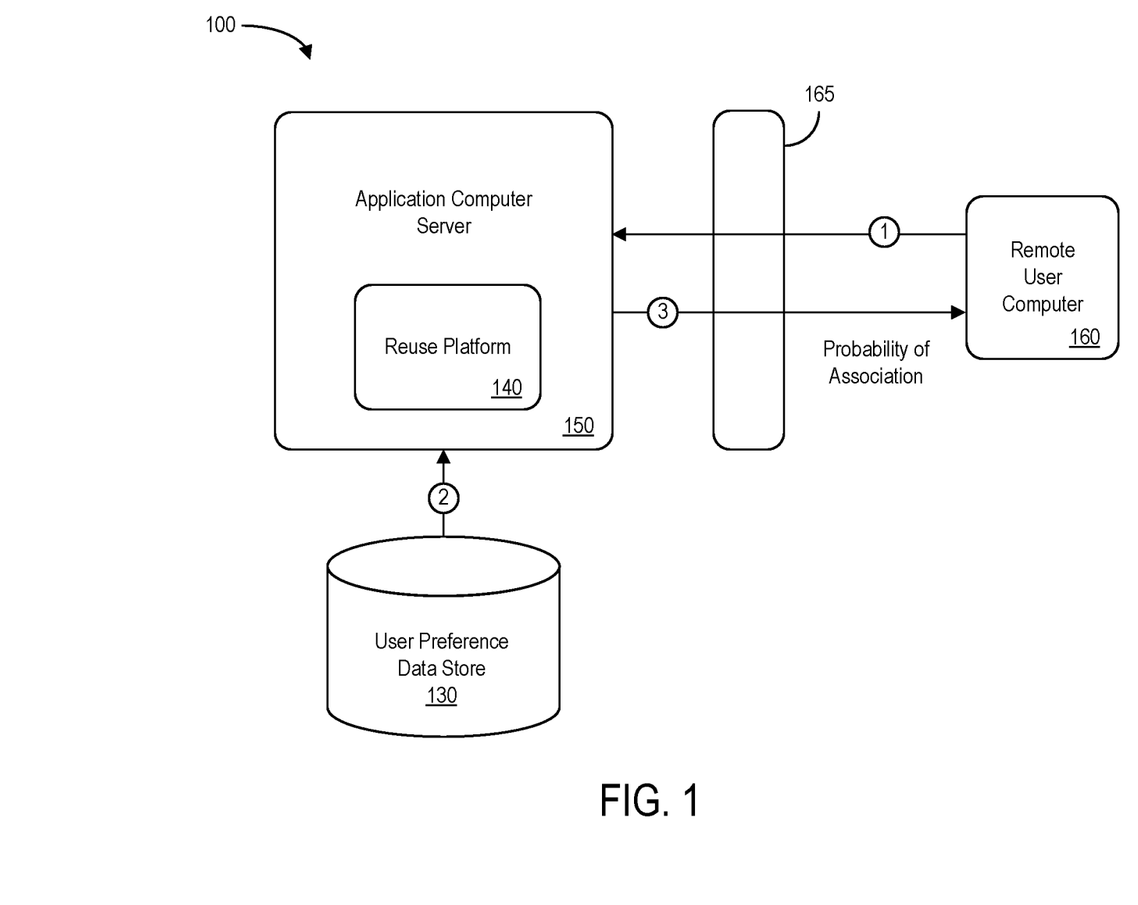
FIG. 1 is a high level block diagram of a computer system in accordance with some embodiments.

It may therefore be desirable to provide systems and methods to facilitate a semi-automatic reuse of data object information across applications and/or across application parts in an efficient and accurate manner. FIG. 1 is a high-level block diagram of a system 100 according to some embodiments of the present invention. In particular, the system includes a user preference data store 130 that provides information to an application computer server 150. The application computer server 150 may also exchange information with a remote user computer 160 (e.g., via a firewall 165). According to some embodiments, a reuse platform 140 executes at the application computer server 150 to facilitate an accurate and efficient reuse of data object information. According to some embodiments, the application computer server 150 and/or reuse platform 140 might be associated with a third-party, such as a vendor that performs a service for an enterprise.

The application computer server 150 might be, for example, associated with a Personal Computer ("PC"), laptop computer, smartphone, an enterprise server, a server farm, and/or a database or similar storage devices. According to some embodiments, an "automated" or "semi-automated" application computer server 150 and/or reuse platform 140 may calculate information that is provided to the remote user computer 160. As used herein, the term "automated" may refer to, for example, actions that can be performed with little (or no) intervention by a human.

As used herein, devices, including those associated with the application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The application computer server 150 may store information into and/or retrieve information from the user preference data store 130. The user preference data store 130 might, for example, store a set of electronic records representing how individual users (or types of users) like to reuse data objection information. The user preference data store 130 may also contain information about past and current interactions with parties, including those associated with remote user computers. The user preference data store 130 may be locally stored or reside remote from the application computer server 150. As will be described further below, the user preference data store 130 may be used by the application computer server 150 to automatically reuse data object information between applications or application parts. Although a single application computer server 150 is shown in FIG. 1, any number of such devices may be included. Moreover, various devices described herein might be combined according to embodiments of the present invention. For example, in some embodiments, the application computer server 150 and user preference data store 130 might be co-located and/or may comprise a single apparatus.

According to some embodiments, the system 100 may automatically reuse data objection information via the application computer server 150. For example, at (1) a user at a remote user computer might indicate that a data object in a source application or application part is related to a data object in a target application or application part. The reuse platform 140 may then access information in the user preference data store 130 at (2) and calculate, for data attributes of the source data object, probabilities that the attribute matches various data attributes of the target data object. This information may then be transmitted to the remote user computer 160 at (3) for display and/or be used in connection with the user preference's to automatically copy the information to the target data object. Note that the reuse platform 140 may, in some embodiments, be tightly and seamlessly integrated with existing applications such that minimal setup requirements are necessary. Instead, the reuse platform 140 may be coupled to applications, plugins, and/or other functional elements so as to be available to users with minimal effort.

In some embodiments described herein, a computer system may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 2:
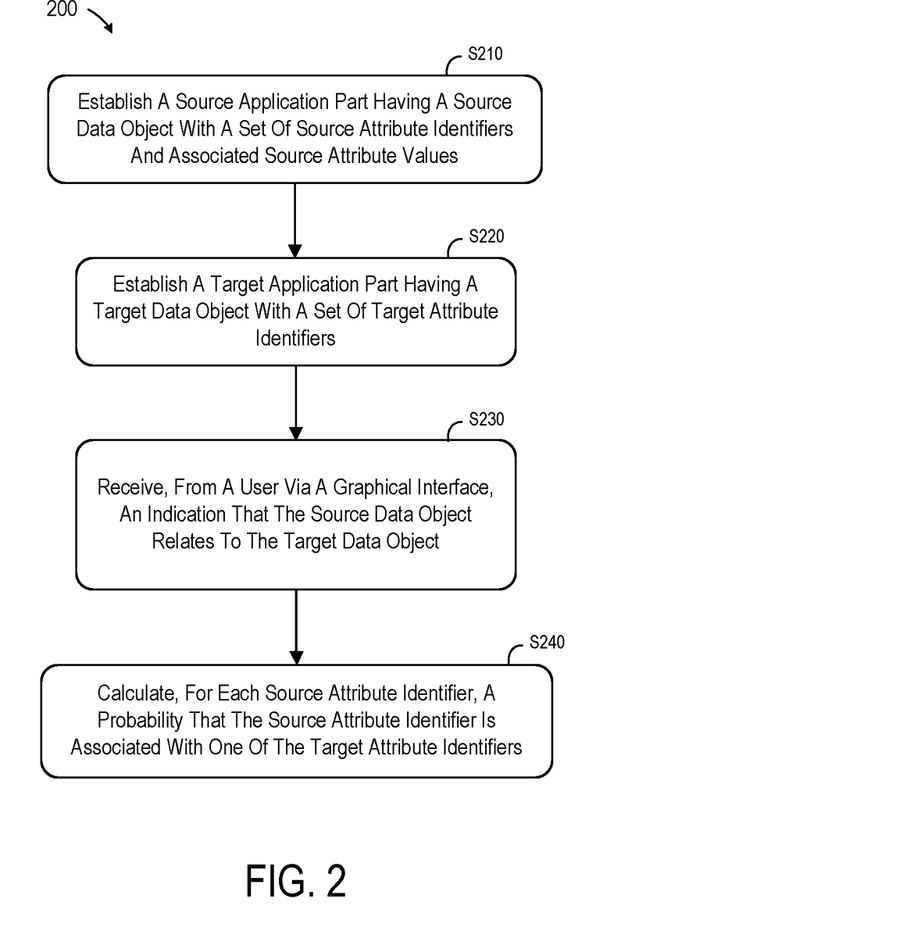
FIG. 2 is a flow diagram of a method according to some embodiments.

Note that the system 100 of FIG. 1 is provided only as an example, and embodiments may be associated with additional elements or components. According to some embodiments, the elements of the system 100 automatically support the semi-automatic reuse of data object information. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may establish a source application part having a source data object with a set of source attribute identifiers and associated source attribute values. At S220, the system may establish a target application part having a target data object with a set of target attribute identifiers. According to some embodiments, wherein the source application part and the target application part are associated with a single application being executed (e.g., a web browser). According to other embodiments, the source application part is associated with a first application being executed and the target application part is associated with a second application being executed. Note that, in this case, the first application and the second application might be applications of the same type (e.g., two spreadsheet applications) or applications of different types (e.g., a web application and a database application).

At S230, the system may receive, from a user via a graphical interface, an indication that the source data object relates to the target data object. For example, the user might click a graphical representation of the source data object and drag the representation over the target data object. At S240, the system may calculate, for each source attribute identifier, a probability that the source attribute identifier is associated with one of the target attribute identifiers (e.g., with a probability of "0.00" indicating that the two attributes are definitely not related and a probability of "1.00" indicating that the two attributes are definitely the same).

According to some embodiments, the calculation performed at S240 applies a machine learning algorithm to the data properties of both the source data object and the target data object. For example, the machine learning algorithm might utilize: a current context of the source application part, a current context of the target application part, prior interactions with the user, and/or prior interactions with other users. Moreover, the calculation performed at S240 might include a search for semantic attributes in a Document Object Model ("DOM") structure and/or tokenizing phrases and normalizing each token using a maximum likelihood estimation tokenizer. According to some embodiments, the calculation performed at S240 includes a weighted dictionary lookup to determine a normalized probability for each word in a phrase, the weighted dictionary including a ranking of synonyms in accordance with usage. According to other embodiments, the calculation includes determining a Levenshtein distance between words.

According to some embodiments, the system may also display the calculated probabilities to the user via the graphical interface. Moreover, the system may automatically copy at least one source attribute value to a target data object based on the calculated probability. For example, all attributes having a probability of "0.50" or higher might be copied to associated target values. According to some embodiments, this automatic copying is also based on a threshold probability value defined by the user via the graphical interface. In other embodiments, this automatic copying might be based on a user selection provided on an object-by-object basis. Note that the object reuse platform may further to receive from the user (e.g., via the graphical interface) an adjustment to the automatically copied value (e.g., to correct an improperly translated or transposed value).

Figure 3:
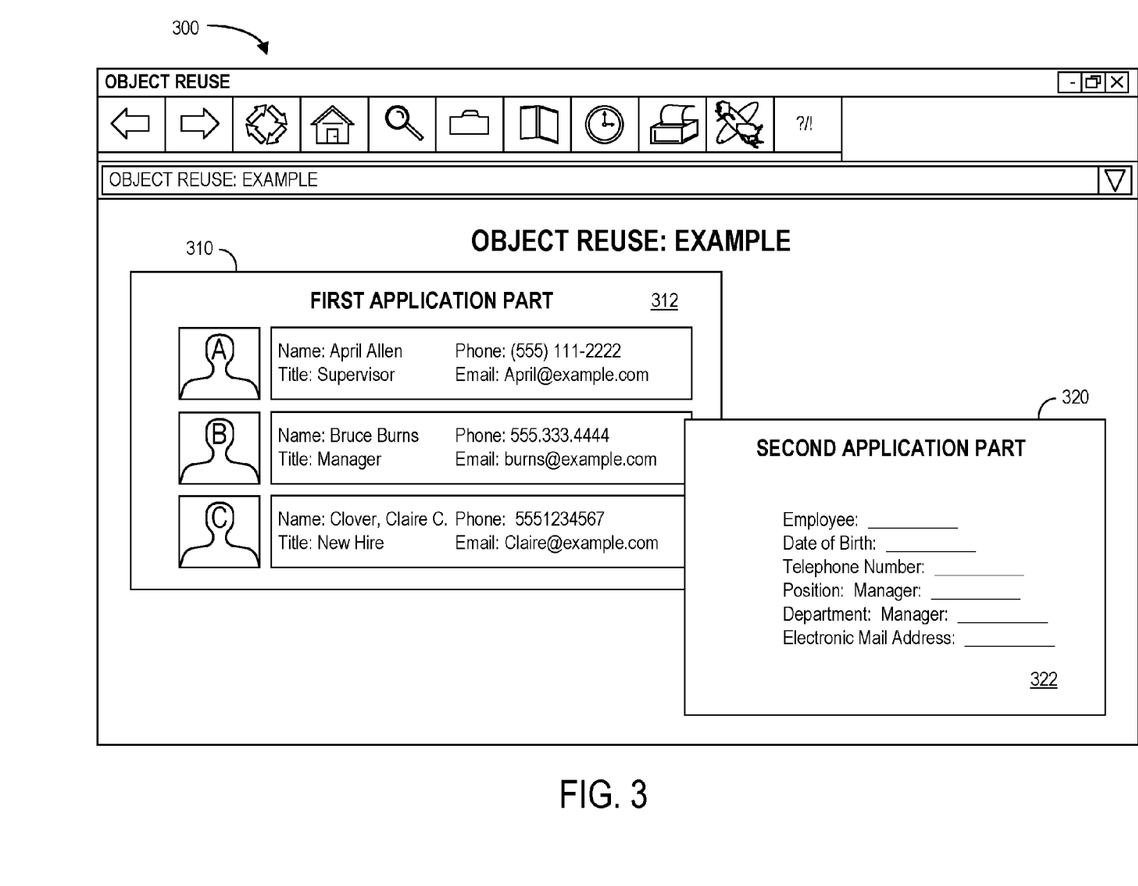
FIG. 3 is an example of one environment in which a business object might be reused in accordance with some embodiments.

FIG. 3 is an example of one environment 300 in which a business object might be reused in accordance with some embodiments. The environment 300 includes a first application part 310 and a second application part 320 that might be associated with a single application or different applications. The first application part 310 includes an area 312 displaying a number of different potential source data objects (e.g., associated with data objects "A" through "C" as illustrated in FIG. 3). The second application part 320 includes an area 322 displaying a target data object. Note that the data objects include a set of data object attribute identifiers (e.g., Name, Phone, Title, etc.). Moreover, the source data objects include values for these attribute identifiers (e.g., April Allen, Bruce Burns, etc.) while the attribute identifiers of the target data object do not (e.g., and are instead associated with blanks ("______").

Figure 4:
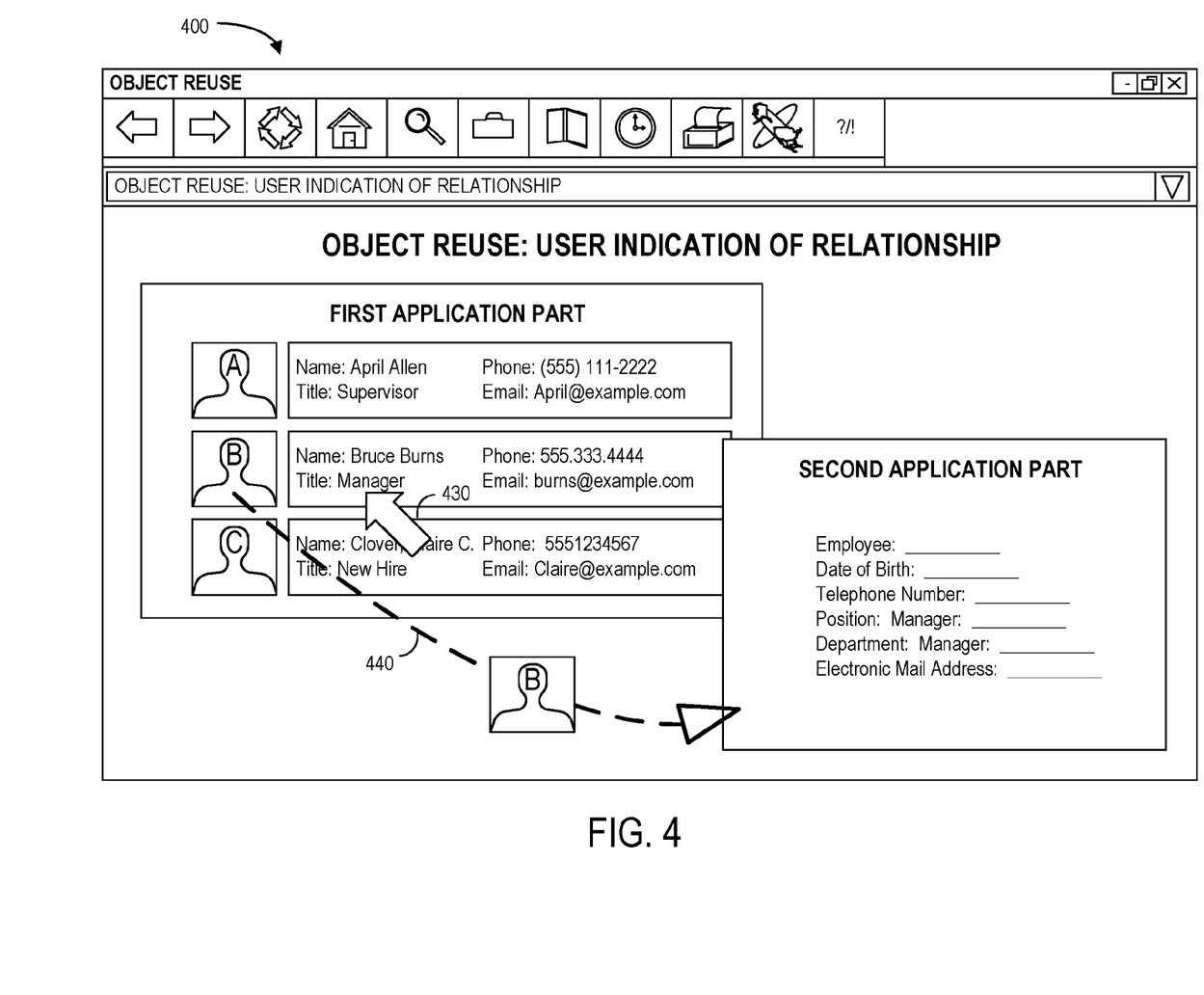
FIG. 4 is an example of another environment in which a business object might be reused in accordance with some embodiments.

Now consider a user who would like to accurately and efficiently copy some of the information in the first application part 310 into the second application part 320. FIG. 4 is an example of another environment 400 in which a business object might be reused in accordance with some embodiments. In this example, the user has utilized a computer mouse pointer 430 to select one of the data objects in the first application part (data object "B") and dragged that object into the second application part (as illustrated by the dashed line 440 in FIG. 4). In this way, a user may seamlessly move objects across applications or across application parts.

Figure 5:
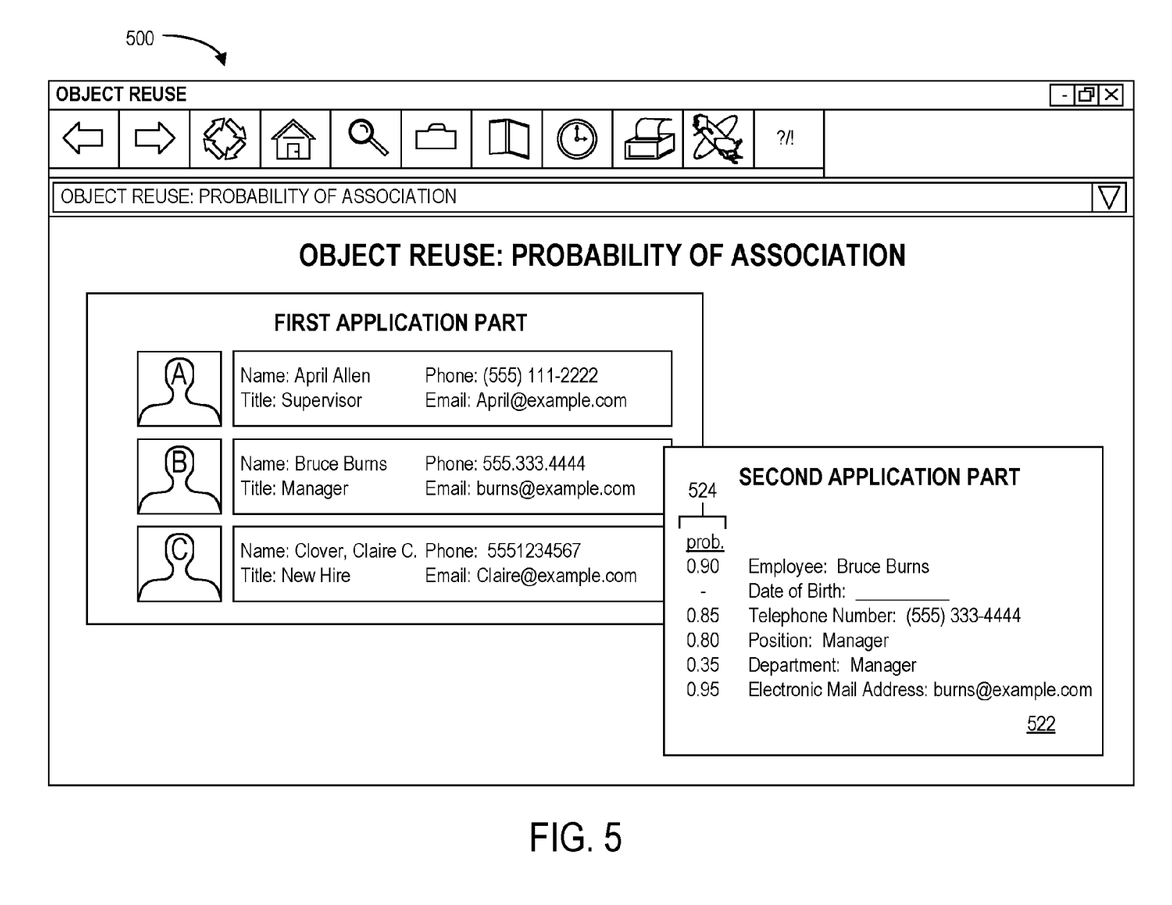
FIG. 5 illustrates attribute probabilities according to some embodiments.

The receiving or target application can then reuse information about the data object as appropriate. According to some embodiments, the receiving application may use machine learning to automatically fill the form with the proper fields and/or display to the user a probability that the data reuse is accurate. For example, FIG. 5 illustrates 500 attribute probabilities according to some embodiments. In this illustration, the information about data object "B" has been mapped to the attributed in the display area 522 of the second application part. Moreover, a probability 524 that the information has been correctly mapped has been calculated and displayed in the display area 524. That is, the system has calculated that there is a "0.80" probability that the value "Manager" taken from the "Title" attribute of the first application part should be mapped to the "Position" attribute in the second application part.

Figure 6:
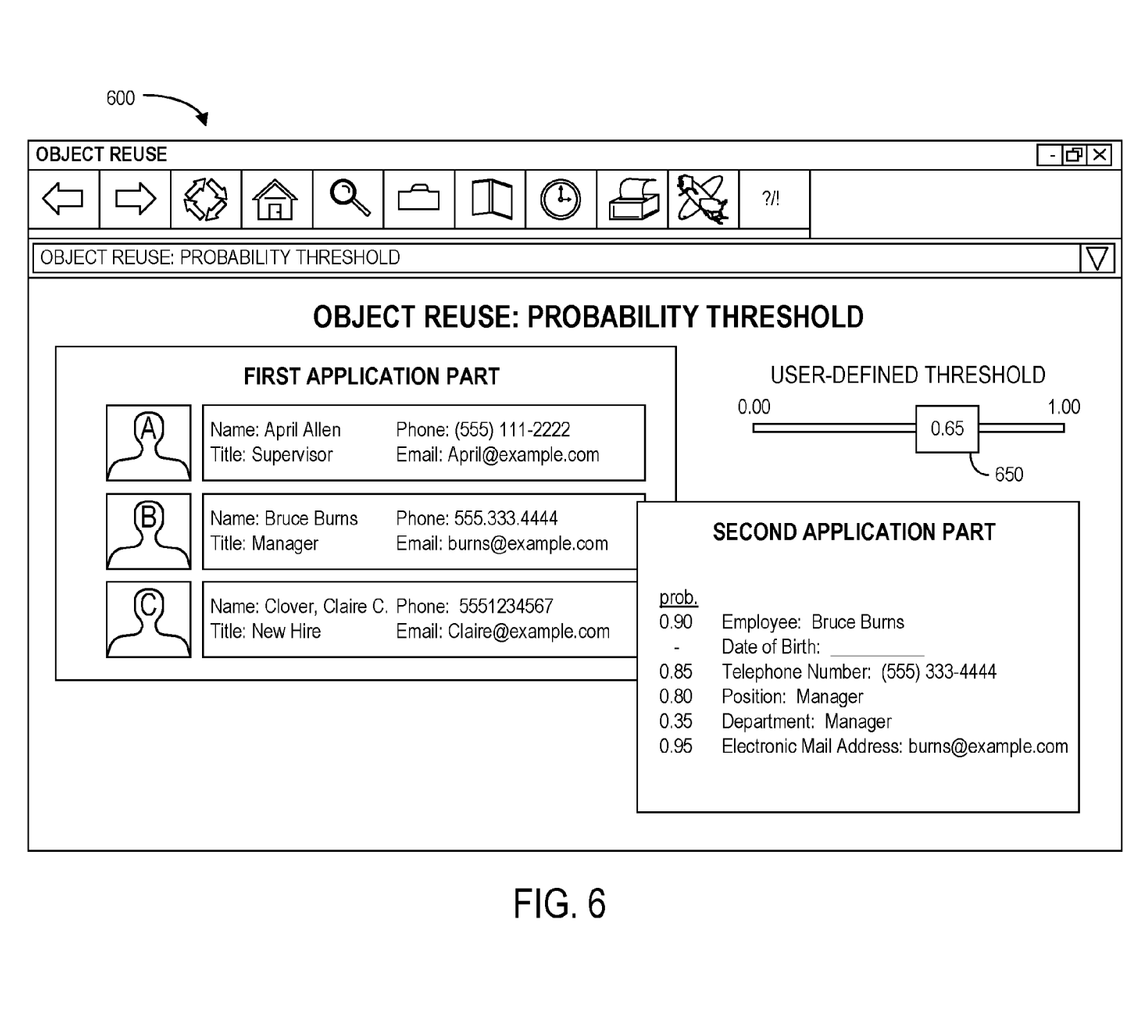
FIG. 6 illustrates the use of one or more probability threshold levels in accordance with some embodiments.
Figure 7:
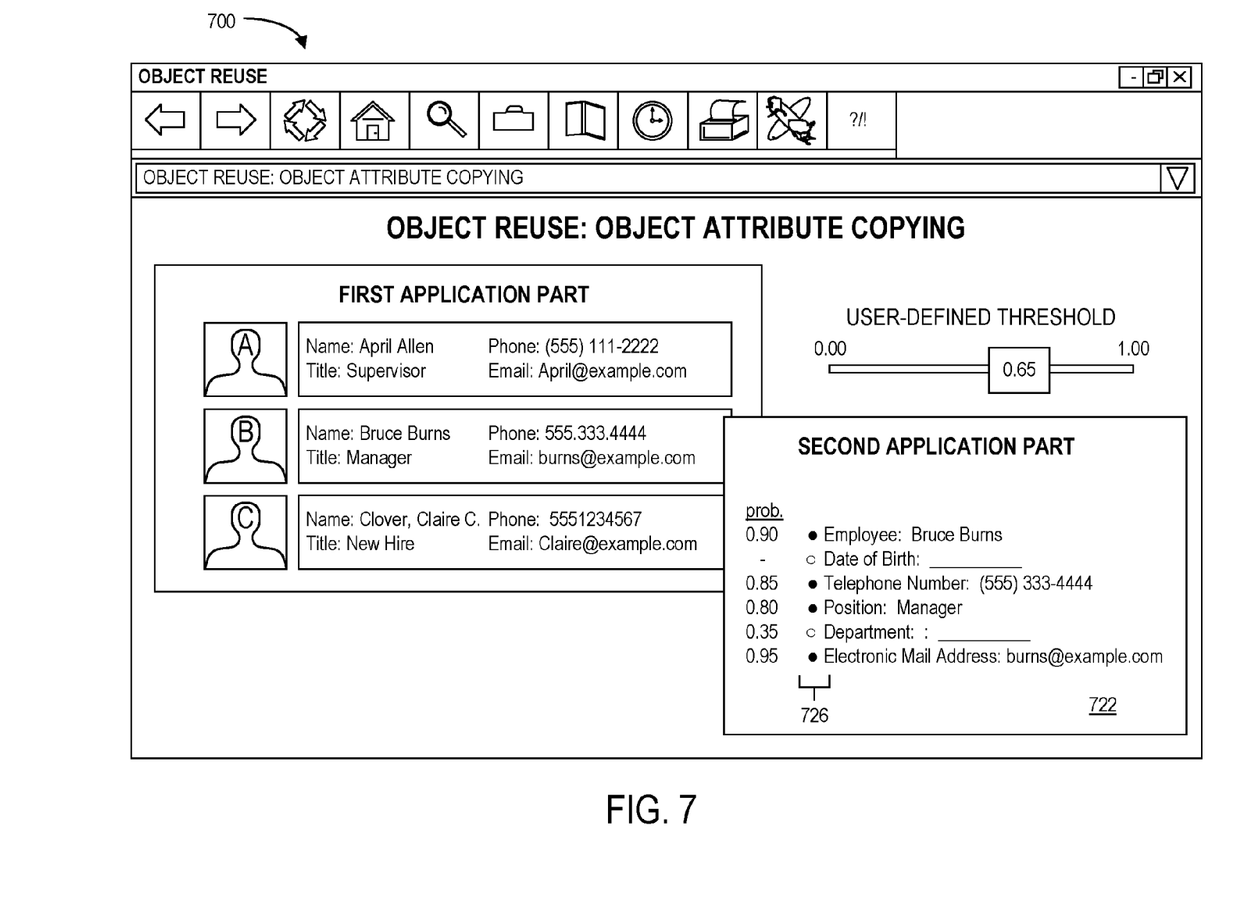
FIG. 7 is an example of a result of business object reuse according to some embodiments.

According to some embodiments, this algorithm is transparent and shows via a probabilities 524 how certain the algorithm is that the corresponding fields are filled correctly. FIG. 6 illustrates 600 the use of one or more probability threshold levels in accordance with some embodiments. That is, according to some embodiments, the user might enter a user-defined threshold value 650 (e.g., via an adjustable sliding scale). Note that user-defined threshold value 650 might be defined on-the-fly and/or be retrieved from a user preference database. According to some embodiments, an initial or default threshold value might be originally provided (e.g., a probability of 0.50 might be used). As the user experiments with various object attribute data reuse scenarios, he or she may adjust the threshold value to fine tune performance as appropriate (e.g., to reduce a number of incorrect assumptions or to increase the amount of data that is automatically copied by the system). In some cases, threshold values might be set based on any of a user-by-user basis, user-role-by-user-roll basis, data-object-by-data-object basis, attribute-by-attribute basis, etc. FIG. 7 is an example 700 of a result of business object reuse according to some embodiments. Note that the value "Bruce Burns" has been copied from the source data object into the "Employee" attribute of the target data object 722 (because the probability of "0.90" is above the "0.65" user-defined threshold value) while the value "Manager" has not been copied from the source data object into the "Department" attribute of the target data object 722 (because the probability of "0.35" is below the "0.65" user-defined threshold value). According to some embodiments, the user may also be allowed to select whether or not information is copied on an attribute-by-attribute basis (e.g., using selectable radio buttons 726 as illustrated in FIG. 7).

Figure 8:
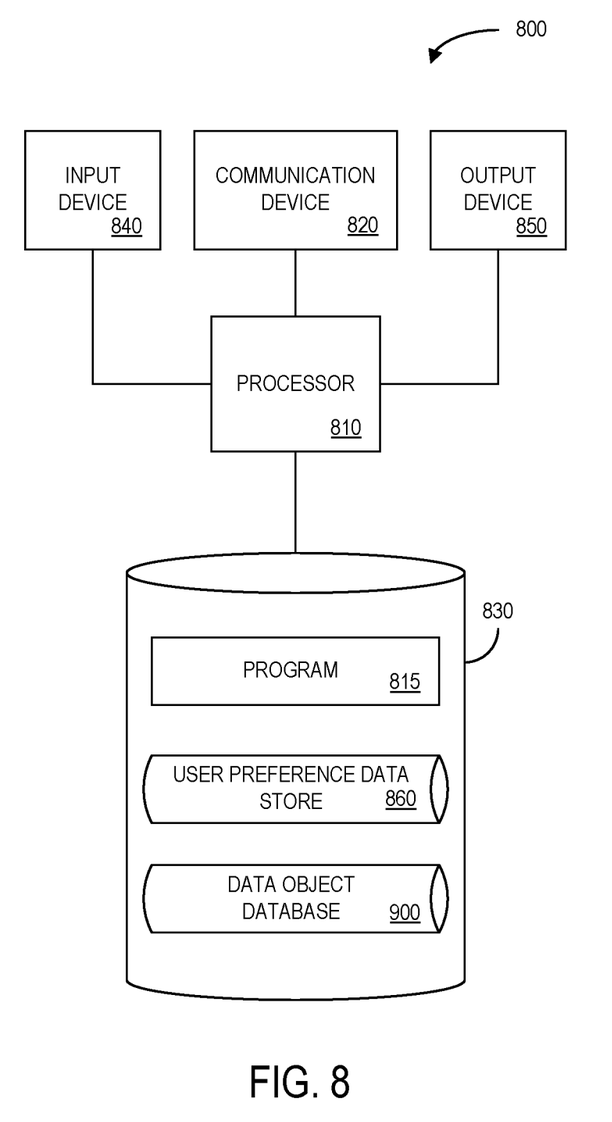
FIG. 8 is a high level diagram of an apparatus or platform in accordance with some embodiments.

Embodiments described herein may comprise a tool or plug-in that helps map source data attributes to target data attributes. For example, FIG. 8 illustrates a data object reuse apparatus or platform 800 that may be, for example, associated with the system 100 of FIG. 1. The reuse platform 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote user devices (e.g., PCs and smartphones). Note that communications exchanged via the communication device 820 may utilize security features, such as those between a public internet user and an internal network of the insurance enterprise. The security features might be associated with, for example, web servers, firewalls, and/or PCI infrastructure. The reuse platform 800 further includes an input device 840 (e.g., a mouse and/or keyboard to enter information about machine learning algorithms, etc.) and an output device 850 (e.g., to output reports regarding user preferences and/or overall system performance).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or an existing association review tool or application for controlling the processor 810. The processor 810 performs instructions of the program 815, and thereby operates in accordance with any of the embodiments described herein. For example, the processor 810 may arrange for a source application part to be established having a source data object with a set of source attribute identifiers and associated source attribute values. A target application part may also be established by the processor 810 having a target data object with a set of target attribute identifiers. The processor 810 may then receive, from a user via a graphical interface, an indication that the source data object relates to the target data object. The processor 810 may then calculate, for each source attribute identifier, a probability that the source attribute identifier is associated with one of the target attribute identifiers.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the reuse platform 800 from another device; or (ii) a software application or module within the reuse platform 800 from another software application, module, or any other source.

In some embodiments (such as shown in FIG. 8), the storage device 830 further stores a user preference data store 860 (e.g., associated with different users, types of users, user roles, etc.) and a data object database 900. An example of a database that might be used in connection with the reuse platform 800 will now be described in detail with respect to FIG. 9. Note that the database described herein is only an example, and additional and/or different information may be stored therein. Moreover, various databases might be split or combined in accordance with any of the embodiments described herein. For example, the user preference data store 860 and/or data object database 900 might be combined and/or linked to each other within the program 815.

Figure 9:
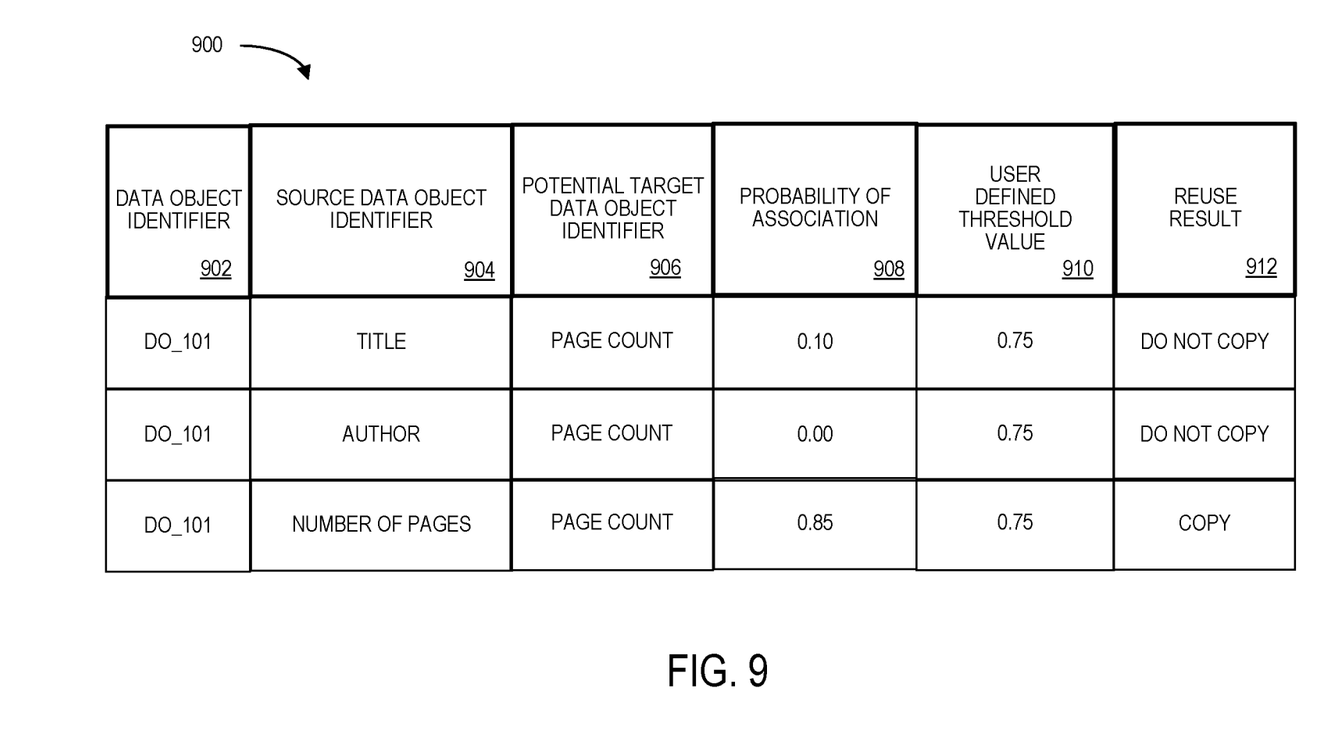
FIG. 9 is a portion of a tabular business object database that might be provided according to some embodiments.

Referring to FIG. 9, a table is shown that represents the data object database 900 that may be stored at the reuse platform 800 according to some embodiments. The table may include, for example, entries identifying data objects that may be used by the system. The table may also define fields 902, 904, 906, 908, 910, 912 for each of the entries. The fields 902, 904, 906, 908, 910, 912 may, according to some embodiments, specify: a data object identifier 902, a source data object identifier 904, a potential target data object identifier 906, a probability of association 908, a user defined threshold value 910, and a reuse result 912. The data object database 900 may be created and updated, for example, based on information electrically received from applications and/or users (e.g., via interactive graphical displays).

The data object identifier 902 may be, for example, a unique alphanumeric code identifying a data object that might be utilized in an application and/or an application part. The source data object identifier 904 may define an attribute of the source data object and the potential target data object identifier 906 may be associated with a potential target attribute. For example, the three entries illustrated in FIG. 9 are associated with the likelihood of three different source attributes (title, author, and number of pages) mapping into a single potential target attribute (page count). The probability of association 908 indicates how sure the machine learning algorithm is that the two value match while the user defined threshold value 910 indicates when the user would like the information to be automatically copied and reused. The reuse result 912 indicates if the probability of association 908 exceeds the user define threshold value 910 ("copy") or if the probability of association 908 does not exceed the user define threshold value 910 ("do no copy").

Figure 10:
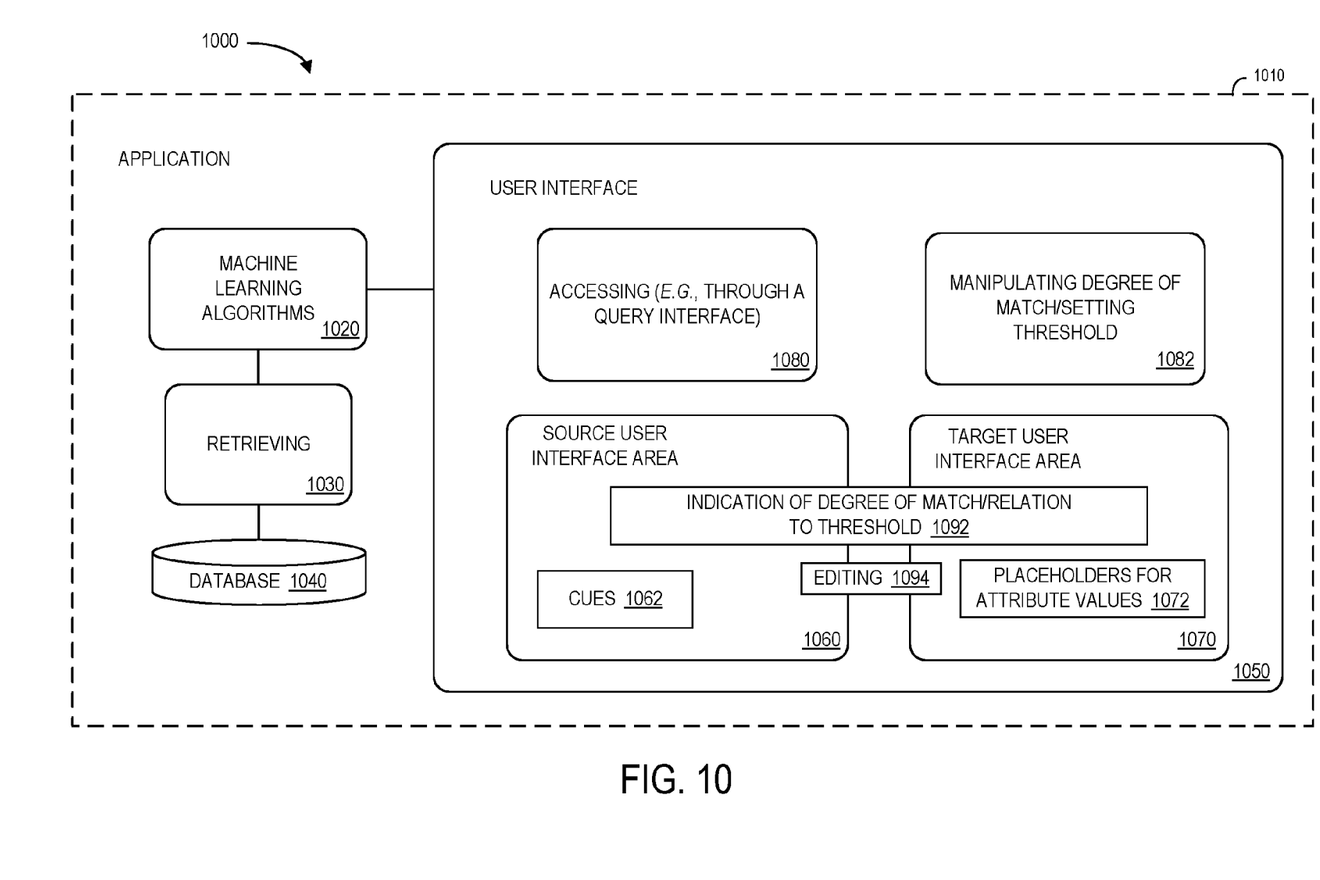
FIG. 10 is a more detailed process diagram example in accordance with some embodiments.

Thus, embodiments may provide an application that is able to connect two random (e.g., unknown at application design-time) web applications during end user utilization such that on-the-fly attributes and attribute values may be available for reuse along with recommendations about the transfer of data between applications or application parts. The user may choose a source application and an application that he or she chooses as a receiving target application (thus, giving the user the option to reuse data from the application which was defined as the current source application). FIG. 10 is a more detailed process diagram 1000 example in accordance with some embodiments. The process diagram 1000 is associated with an application 1010 that includes machine learning algorithms 1020 that can retrieve 1030 information from a database 1040 (e.g., including user preferences, weighted dictionary values, etc.). The application also includes a user interface 1050 with a source user interface area 1060 (with cues 1062) and a target user interface area 1070 (with placeholders for attribute values 1072). The user interface 1050 may access information 1080 (e.g., via a query interface) and/or manipulate a degree of matching or setting a threshold value 1082 in accordance with any of the embodiments described herein. An indication of a degree of match and/or relation to threshold 1092 and/or editing functions 0194 may be provided as will now be described.

In this way, embodiments may facilitate object reuse across applications without requiring that attributes be mapped onto each other during design time (in terms of predefined mappings). Instead, during runtime, attributes rendered on the user interface (or present in some form in a DOM tree) in a random source web application can be identified to qualify as input parameters to be used in a random target web application in order to carry over the respective attribute values which are required from the source for use in the target web application. One practical use case, for example, may be form filling, where the attribute-based contents of the source application should be used in the respective entry fields of a second target application, relieving the user to manually copy data from the source application into the target application.

Some embodiments relate to the circumstance in which a probability for each data transfer—the transfer of attribute values—from the source to the target application is computed. In this way, not only is the user effort reduced in terms of the operational procedure of copying the data, moreover (since the entry fields in the target application can be pre-filled with a certain degree of probability pertaining to the suitability or correctness) the user may also relieved from making semantic inferences in this regard. Related to this aspect may be an enablement of users to set a threshold which will apply to any attribute with respect to its values determining that the attribute value should be carried over only when the user-stated probability threshold is met or surpassed after the respective computations are made.

Optionally, users may indicate for which target fields any tentative input from the source application and its attributes should be considered. In some cases, the user may modify the automatically inserted data such that it matches his or her individual needs—by removing parts of the input or by complementing it where required. While it may be at the user's discretion which applications to select, it might be assumed that the first application, the source application, has the character of providing data whereas the second, the target application, has the character to receive data or reuse objects or parts thereof (e.g., attribute values from the former).

Instead of providing methods which are limited to the operational or manual procedure commonly understood as user input methods, embodiments described herein encompass computational procedures commonly understood as machine learning procedures which enable users to receive suggestions with respect to matches between source and target attributes which may be consumed or transformed by the users. This may reduce efforts associated with user input methods and pertaining to the data transfer from the source to the target application. This may be achieved by applying particular machine learning algorithms which can inspect data properties of both the source and target applications (and consider user input) as to the probability which should hold true with respect to the match between source and target attributes that are deemed to be identical (or sufficiently similar) in order to qualify that the respective attribute values can be transferred from the source to the target application. This procedure might be realized by offering the users an interaction control (e.g., a slider control) to indicate a level of probability for this purpose. Also, optionally, the user may be equipped with additional controls (e.g., checkboxes) to indicate whether the respective attribute in the target application should serve as a trigger to inspect the source application for attributes which might qualify in order to propose their value as a data input for the target application attribute.

Furthermore, some matching algorithms may include machine learning algorithms that are expanded in additional ways (e.g., considering the current working context of users or their previous interaction history). As an example, a user's previous manipulation of the threshold for the probability of recommendations could be taken as indicative of subsequent user preferences in this regard.

In addition to the straight forward use case where a user needs to use two web applications and transfer information from one to the other, there are additional application areas associated with context awareness or situation awareness. For example, an application may further assist a user by providing means to collect information/data from multiple sources mainly in enterprise applications in (data) "collections." A goal of such an application may be, amongst others, to support information gathering and collaborative decision making. Finally, a user may then utilize data when data entry (as a result of the supported information gathering and decision making process) is required. As another example, a situation handling scenario application may include an engine that recognizes business situations where user action is required by evaluating rules in the business system. When such a situation is recognized, this information may be provided to a set of users with related information and recommended actions. The user now may want to use the related information provided with the situation for data entry into web applications (from the enterprise or from other providers) to keep the business processes running or to resolve a corresponding issue. According to some embodiments, the information provided with the situation may be mapped to the target application with the support as described in connection with any of the embodiments herein.

Some matching algorithms will now be described by way of examples, and these descriptions depict only a few potential implementations. Note, however, that the embodiments described herein are general enough to imply alternative embodiments, enabling adaptations which can facilitate or even improve an ease of exchange, a consideration of specific needs reflective of various application areas, and may result in, for example, a "procurement algorithm," a "sales algorithm," etc.

A goal of some of the matching algorithms described herein may be to achieve a completion of completely unknown fields in an unknown form. Consider, for example, an employee who may want to purchase a book he or she has found on Amazon.com® through an in-house product purchasing system. In this case, the source user interface area 1060 might be associated with the Amazon website, including the following information:

Title: "Lord of the Rings"
Author: J. R. R. Tolkien
Number of pages: 433 pages
ISBN-10: 0547928211
Language: English Note that the system 1000 may automatically identify the book and extract important attribute values like "Language: English," "Author: J. R. R. Tolkien," etc.

Now consider that the target user interface area 1070 as being in-house interface for the purchase of books. A goal of the algorithm may be to seamlessly complete the form in the target user interface area 1070, which could look like this:

Book Name: _________
Author/s: _________
Page-count: _________

The object reuse may consist of reusing the book data found on Amazon for a different purpose (form-filling). This may be done, for example through the means of a drag-and-drop user action, where he or she drags an icon of the book from the source user interface area 1060 to the target user interface area 1070. The next step in the process may be to identify which attribute values correspond to which fields, and how to compute how certain the system is that such a mapping is correct.

Note that a generic algorithm may be desired such that it works on any object, even when the developer has no design-time (e.g., beforehand) access to the object—as is the case with the Amazon website (assuming a third-party developer). The system may further assume that the developer also has no design time access to the target user interface area 1070.

There are two issues that an algorithm may address:
1) identifying that the first empty field (_________) is semantically linked to "Book Name" (as structurally in an XML form these fields may happen to be spatially separated); and
2) matching arbitrary phrases/keywords such as "Number of pages" to "Page count" (or "E-mail" to "mail").

According to some embodiments, a solution to the problem may be provided in JavaScript such that an algorithm may solve these problems for HTML forms. Note that an algorithm may searches for attributes in a DOM structure (but they or other semantic data could also be retrieved from the backend). For connecting the input field to a certain phrase that it represents, the system may use clues in the HTML. For example, after statistical analysis the system might find that if all a label a name, an identifier, a title and a class are present—then their descriptiveness are ranked as label>name>title>identifier>class (where label is usually the most descriptive).

A real world example of a form with all attributes present might look like the following:

```
<label for="ap_email"> Email (phone for mobile accounts) </label>
<input type="email" maxlength="128" id="ap_email" name="email"
tabindex="1" class="a-input-text a-span12 auth-autofocus auth-required-
field">
```

Where it can be seen that the label carries the most information. In one embodiment, the system may select the first present clue:

```
// Get the best phrase for the input field
var bestClue =
    // Try selecting a label sibling
```

```
(field.parentNode.querySelector('label').length) ?
field.parentNode.querySelector('label').textContent :
    // Try selecting a name, id, title, etc.
    field.getAttribute('name') ||
    field.getAttribute('id') ||
    field.getAttribute('class')
```

This results in the phrase "Page-count" being recognized in the label and ready to be compared and matched against the object fields (such as "Number of pages"). For ease of use, the system may tokenize the phrase into a set of tokens and normalize all the tokens in lowercase and remove special characters. For example, "Page-count" becomes {"page", "count"}, "Danny's phone" becomes {"danny", "phone"} "Person's e-mail" becomes {"person", "email"}, etc. where the order of the tokens does not matter. One approach is to train a simple Maximum Likelihood Estimation ("MLE") tokenizer.

Some embodiments may find and tokenize the "Number of pages" property into {"page", "number", "of"}. Each word may be given a normalized probability in accordance to the number of words. In the above example:

{"page": 0.33, "number": 0.33, "of": 0.33}

The system may then use a weighted dictionary that has a ranking of synonyms in accordance to their use in language to build combinations of the set with different synonyms, while scaling down the probabilities according to the accuracy of the synonym. In some cases, 100% for the best synonyms and 50% for the worst may give accurate and intuitive results:

```
{"page": 0.33, "count": 0.2, "of": 0.33}, sum of probability: 0.86
{"leaf": 0.25, "count": 0.2, "of": 0.33}, sum of probability: 0.78
etc.
```

In this way, the system compute different combinations of synonyms for a single field, such as:

```
{"page": 0.33, "count": 0.2, "of": 0.33}, {"leaf": 0.25, "count":
0.2, "of": 0.33} etc.
```

The system may now compare all of the combinations to all of the sets derived from the candidate fields one of which happens to be {"page", "count"}. The system may then divide the candidate fields into probabilities like we did for the object property, such that {"page", "count"} becomes {"page": 0.5, "count": 0.5}. The system may then compare all of the synonym sets to the candidate field and calculate a new probability by taking the sum of the probabilities of all of the matching terms and dividing by 2.

By way of example {"page": 0.5, "count": 0.5} may be compared to {"page": 0.33, "count": 0.2, "of": 0.33}, with the matching terms being "page" and "count." As a result, the sum becomes:

$$\frac{0.5 + 0.33}{2} + \frac{0.2 + 0.5}{2} = 0.41 + 0.35 = 0.76$$

where the first term comes from "page" and the second from "count."

Another example, "Email address" may be compared to "email" to give the sets {'email': 0.5, 'address': 0.5} and {'email': 1.0} and a probability of (0.5+1)/2=0.75. Note that when no terms match at all, the probability may be set to 0.

The algorithm now has possible combinations of the "Number of pages" property compared to a single field: "Page-count." As a next step, the algorithm may take the one with the best probability (the {"page": 0.33, "count": 0.2, "of": 0.33} match) which gives an overall probability of "0.76." The system may then repeat these steps for each field (and again take the best combination) to determine:

Book Name→0 probability
Author/s:→0 probability
Page-count:→0.76 probability

Note that a threshold may also be applied when only low probabilities are found. The algorithm may then repeat the process for all fields of the object and get, for example:

Page-count→Number of pages 0.76
Page-count→Author 0.0
Page-count→ISBN 0.0 etc. and fill in the best one (Number of pages) in the field "Page-count." Similarly, the system may fill in the best match for all other fields as well.

In a situation where no dictionary Application Programming Interface ("API") is available, a distance of the words might be compared using the Levenshtein distance (instead of a dictionary lookup) where the probability gets computed on the basis of how close the terms are. This method might be less accurate (as it has no semantic nature and doesn't understand that "address" corresponds to "place of life") but could nevertheless be successfully deployed in many cases.

Thus, embodiments may provide a light-weight, runtime-oriented approach, reducing the effort on the side of developers and/or consultants to prepare or define any more (or less) explicit mappings between particular applications or between any particular attributes which may be part of any source or target application (that is, provide a substantially reduced instrumentation effort). Note that some embodiments might be used even when no previous planning for use was contemplated by the designers of the source and/or target applications. That is, embodiments might be useful even when no pre-conceived goal for its use was considered (making such a light-weight approach compelling). Moreover, embodiments may provide a user-oriented, interactive approach, where users can benefit from recommendations on-the-fly, reducing both the manual effort of data transfer (e.g., by copy-paste or drag-and-drop procedures) and the cognitive effort of determining which source attributes match target attributes so that the source attribute values can be carried over. Moreover, embodiments may result in an interactive disambiguation (and/or "negotiation") approach in terms of distribution of control between application (the algorithm) and the user (human operator), by letting the user inspect the probabilities pertaining to the outcomes of the recommendations (as well as the subjective expectations in terms of a threshold which should be applied and which can be manipulated at the discretion of the user). Optionally, embodiments may enable a user to indicate for which target attributes any data transfer from the source attributes should be suspended (or not suspended). Similarly, embodiments may track interaction history as another source in terms of learning about user preferences to adapt subsequent recommendations with respect to data transfer from source to target application attributes.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 11:
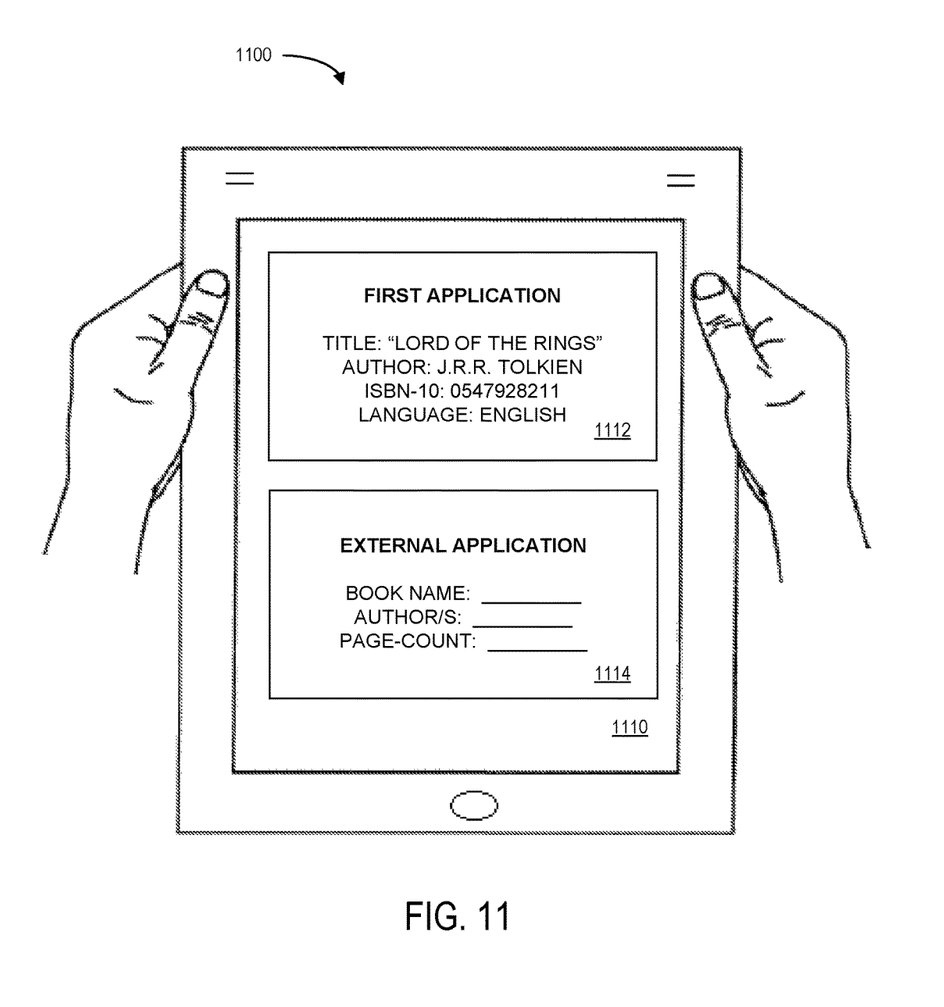
FIG. 11 illustrates a table or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of data structures and attribute characteristics, embodiments may instead be associated with other types of data (e.g., additional information might be collected and/or automatically generated about source data objects, target data objects, etc.). Still further, the displays and devices illustrated herein are only provided as examples, and embodiments may be associated with any other types of user interfaces. For example, FIG. 11 illustrates a table or handheld computer 1100 being used according to some embodiments. In particular, computer 1100 includes a display 1110 with a first application area 1112 and an "external" application area 1114 (that is, the application is external to the first application). In this way, a user might utilize a touch sensitive screen to move information from a source object in the first application area 1112 into a target object in the external application area 1114.

According to some embodiments, data may be used in conjunction with one or more models to take into account a large number of source and target data object parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior examples and outcomes known to an enterprise. The specific data and outcomes analyzed may vary depending on the desired functionality of the particular predictive model. The particular parameters selected for analysis in the training process may be determined by using regression analysis and/or other statistical techniques known in the art for identifying relevant variables and associated weighting factors in multivariable systems. The parameters can be selected from any of the structured data parameters stored in the present system, whether the parameters were input into the system originally in a structured format or whether they were extracted from previously unstructured text, such as from big data.

Embodiments described herein are solely for the purpose of illustration. Those in the art will recognize other embodiments may be practiced with modifications and alterations to that described above.

What is claimed is:
1. A system, comprising:
a communication port to receive information from a user via a graphical user interface; and
an object reuse platform, coupled to the communication port, including:
a memory storing processor-executable program code, and
a processor to execute the processor-executable program code in order to cause the object reuse platform to:

determine information about a source application part having a source data object with a set of source attribute identifiers and associated source attribute values, determine information about a target application part having a target data object with a set of target attribute identifiers, receive from a user via the communication port an indication that the source data object relates to the target data object, calculate, for each source attribute identifier, a probability that the source attribute identifier is associated with one of target attribute identifiers, display the calculated probabilities to the user via the graphical interface, and automatically copy at least one source attribute value to a target data object based on the calculated probability and a threshold probability value defined by the user via the graphical interface.

2. The system of claim 1, wherein the source application part and the target application part are associated with a single application being executed.

3. The system of claim 1, wherein the source application part is associated with a first application being executed and the target application part is associated with a second application being executed.

4. The system of claim 3, wherein the first application and the second application are applications of the same type.

5. The system of claim 3, wherein the first application and the second application are applications of different types.

6. The system of claim 1, wherein said automatic copying is further based on a user selection provided on an object-by-object basis.

7. The system of claim 1, wherein the object reuse platform is further to receive from the user via the graphical interface an adjustment to the automatically copied value.

8. The system of claim 1, wherein said calculation is performed by applying a machine learning algorithm to the data properties of both the source data object and the target data object.

9. The system of claim 8, wherein the machine learning algorithm is further associated with at least one of: (i) a current context of the source application part, (ii) a current context of the target application part, (iii) prior interactions with the user, and (iv) prior interactions with other users.

10. The system of claim 8, wherein said calculation includes a search for semantic attributes in a document object model structure.

11. The system of claim 8, wherein said calculation includes tokenizing phrases and normalizing each token using a maximum likelihood estimation tokenizer.

12. The system of claim 11, wherein said calculation includes a weighted dictionary lookup to determine a normalized probability for each word in a phrase, the weighted dictionary including a ranking of synonyms in accordance with usage.

13. The system of claim 11, wherein said calculation includes determining a Levenshtein distance between words.

14. A computer-implemented method, comprising:

establishing, by a computer processor of an object reuse platform, a source application part having a source data object with a set of source attribute identifiers and associated source attribute values;

establishing, by the computer processor of the object reuse platform, a target application part having a target data object with a set of target attribute identifiers;

receiving, by the computer processor of the object reuse platform from a user via a graphical interface, an indication that the source data object relates to the target data object;

calculating, by the computer processor of the object reuse platform for each source attribute identifier, a probability that the source attribute identifier is associated with one of the target attribute identifiers;

displaying, by the computer processor of the object reuse platform, the calculated probabilities to the user via the graphical user interface; and automatically copying, by the computer processor of the object reuse platform, at least one source attribute value to a target data object based on the calculated probability and a threshold probability value define by the user via the graphical user interface.

15. The method of claim 14, wherein said automatic copying is further based on at least one of: (i) a user selection provided on an object-by-object basis, and (ii) an adjustment to the automatically copied value received from the user via the graphical interface.

16. A non-transitory, computer-readable medium storing program code, the program code executable by a processor of an object reuse platform to cause the object reuse platform to:

establish a source application part having a source data object with a set of source attribute identifiers and associated source attribute values;

establish a target application part having a target data object with a set of target attribute identifiers;

receive, from a user via a graphical interface, an indication that the source data object relates to the target data object;

calculate, for each source attribute identifier, a probability that the source attribute identifier is associated with one of the target attribute identifiers;

display the calculated probabilities to the user via the graphical user interface; and automatically copy at least one source attribute value to a target data object based on the calculated probability and a threshold probability value define by the user via the graphical user interface.

17. The medium of claim 16, wherein said calculation is performed by applying a machine learning algorithm to the data properties of both the source data object and the target data object, and further wherein the machine learning algorithm is associated with at least one of: (i) a current context of the source application part, (ii) a current context of the target application part, (iii) prior interactions with the user, and (iv) prior interactions with other users.

* * * * *